(12) United States Patent
Branagan et al.

(10) Patent No.: US 8,795,448 B2
(45) Date of Patent: Aug. 5, 2014

(54) WEAR RESISTANT MATERIALS

(75) Inventors: Daniel James Branagan, Idaho Falls, ID (US); Brian Meacham, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 643 days.

(21) Appl. No.: 11/684,549

(22) Filed: Mar. 9, 2007

(65) Prior Publication Data

US 2008/0293558 A1 Nov. 27, 2008

Related U.S. Application Data

(63) Continuation of application No. PCT/US2005/002994, filed on Jan. 31, 2005.

(60) Provisional application No. 60/540,498, filed on Jan. 29, 2004.

(51) Int. Cl.
*C21D 8/02* (2006.01)

(52) U.S. Cl.
USPC .......... 148/542; 148/548; 148/522; 501/96.3; 428/402; 423/289

(58) Field of Classification Search
USPC .................................. 148/325, 542
See application file for complete search history.

(56) References Cited

U.S. PATENT DOCUMENTS

| | | | |
|---|---|---|---|
| 3,864,154 A | 2/1975 | Gazza et al. | |
| 4,405,368 A | 9/1983 | Ray et al. | |
| 4,405,388 A | 9/1983 | Repas | |
| 4,487,630 A * | 12/1984 | Crook et al. | 420/36 |
| 4,555,326 A * | 11/1985 | Reid | 208/48 R |
| 4,595,545 A * | 6/1986 | Sane | 264/621 |
| 5,116,416 A * | 5/1992 | Knox et al. | 75/238 |
| 5,143,540 A | 9/1992 | Pyzik | |

(Continued)

FOREIGN PATENT DOCUMENTS

| | | |
|---|---|---|
| AU | 645450 | 1/1994 |
| GB | 2263911 | 8/1993 |

(Continued)

OTHER PUBLICATIONS

European Office Action dated Apr. 28, 2009 issued in related European Patent Application No. 05722633.4.

(Continued)

*Primary Examiner* — Jessee Roe
*Assistant Examiner* — Christopher Kessler
(74) *Attorney, Agent, or Firm* — Grossman, Tucker, Perreault & Pfleger, PLLC

(57) ABSTRACT

A hard phase material is provided for increasing the hardness of a matrix material and improving the wear resistance thereof. The hard phase material is an aluminum boride material having the structure $AlB_{8-16}$. The aluminum boride hard phase may be incorporated into a matrix material by mixing particulate aluminum boride with the matrix material and through precipitation of aluminum boride from the matrix material. Materials including the aluminum boride hard phase may be used in coating applications to provide a hard and wear resistant coating. Aluminum boride hard phase may also be incorporated into metallurgical products to improve the hardness and wear resistance of the metallurgical products.

12 Claims, 1 Drawing Sheet

(56) References Cited

U.S. PATENT DOCUMENTS

| | | | | |
|---|---|---|---|---|
| 5,268,339 | A | * | 12/1993 | Aghajanian et al. ........... 501/127 |
| 5,318,604 | A | | 6/1994 | Gorsuch et al. |
| 5,478,418 | A | * | 12/1995 | Miura et al. .................. 148/438 |
| 5,648,303 | A | | 7/1997 | Nakamura |
| 6,258,185 | B1 | * | 7/2001 | Branagan et al. ............. 148/525 |
| 2003/0042647 | A1 | | 3/2003 | Pyzik |
| 2003/0113575 | A1 | | 6/2003 | McDevitt |

FOREIGN PATENT DOCUMENTS

| | | |
|---|---|---|
| JP | 02030396 | 1/1990 |
| JP | H02149678 | 6/1990 |
| JP | H04132658 | 5/1992 |
| JP | H05245762 | 9/1993 |
| JP | H06238854 | 8/1994 |
| JP | H07237964 | 9/1995 |
| JP | 2000290080 | 10/2000 |
| JP | 2002241965 | 8/2002 |
| JP | 2003013110 | 1/2003 |
| WO | WO 02076677 A1 * | 10/2002 |

OTHER PUBLICATIONS

European Search Report dated Dec. 21, 2007 issued in European Patent Application No. 05722633.4-2122.
European Office Action dated Apr. 9, 2008 issued in European Patent Application No. 05722633.4-2122.
Kharlamov, et al., "Wetting of hot-pressed aluminum borides and borocarbides by molten aluminum and copper," Powder Metaliurgy and Metal Ceramics, vol. 40, Nos. 1-2, 2001 (pp. 65-70).
Chinese Office Action dated Jul. 31, 2009 issued in related Chinese Patent Application No. 200580007640.4.
Liu Yonghe, et al., "Effects of Combustion Conditions on the Characteristics of Ab03/AIB12 Composite Powders Produced by Self-Propagation High-Temperature Synthesis," Journal of Inorganic Materials, vol. 15, No. 3, Jun. 2000.
European Office Action dated Oct. 1, 2008 issued in related European Patent Application No. 05722633.4-2122.
Notice of Reasons for Rejection dated Jun. 28, 2011 issued in related Japanese Patent Application No. 2006551540.
Notification of the Second Office Action dated Feb. 21, 2012 issued in related Chinese Patent Application No. 200580007640.4. (5 pgs) [Note: Cited Ref. D1 has previously been submitted to USPTO in an IDS filed Sep. 18, 2009].

* cited by examiner

WEAR RESISTANT MATERIALS

CROSS REFERENCE TO RELATED APPLICATIONS

This application is a continuation of International Application No. PCT/US2005/002994 filed Jan. 31, 2005 and published Aug. 11, 2005 as International Publication No. WO 2005/072954, designating the United States, and which claims benefit of U.S. Provisional Application No. 60/540,498 filed Jan. 29, 2004.

FIELD OF INVENTION

The present invention is directed at hard phase materials, and more particularly at hard phase materials that may be used to increase the hardness and wear resistant characteristics of coatings and metallurgical products. Specifically, aluminum boride compounds based upon $AlB_{8-16}$ are disclosed to increase the hardness of metal coatings when incorporated into the metal coating matrix. The invention herein also relates to methods of preparing the subject aluminum boride compounds as feedstock materials and their incorporation into metallic, ceramic or polymeric matrix materials. In addition, the invention herein also relates to selected incorporation of the subject aluminum boron compounds in specific identified alloy compositions and at various selected concentrations.

BACKGROUND OF INVENTION

Wear resistant materials are often used in coating or hardfacing applications to protect the underlying material from rubbing, impact, frictional wear and similar potentially damaging mechanical actions. Wear resistant coatings or hardfacings may include a layer of uniformly hard or wear resistant material. However such materials are often expensive and may not be readily susceptible to forming coatings on their own. For this reason, one strategy for developing wear resistant coatings is to incorporate a hard phase into a material that is more susceptible to coating or a hardfacing processes and that is more cost effective. Often, producing an effective wear resistant coating material may require incorporating a high volume fraction of the hard phase into the coating material.

The hard phase, or domains of wear resistant material dispersed in the wear resistant coating, are often ceramic materials. Ceramic materials that are especially suitable generally have chemical structures that involve electron transfers leading to very strong ionic (although in some cases covalent) bonding. The result is very stable, strong and high melting point compounds.

Conventionally, wear resistant coating materials are ceramic, metallic, or polymeric material incorporating the hard phase. For example, the hard phase may be incorporated into an iron based alloy. The iron-based alloy allows the coating to be applied to a substrate while the hard phase provides the wear resistant characteristics. In the case of ceramic hard phase materials, the hard phase may be provided as particles dispersed in the ceramic, metallic, or polymeric matrix.

Recently, a great deal of research and development has been directed at developing wear resistant thermal spray and hardfacing alloys that incorporate carbide materials into a ductile matrix. Carbides, such as tungsten-carbide (WC), titanium-carbide (TiC), chromium-carbide ($Cr_3C_2$), and the like have been used as hard phases within ductile matrices such as cobalt, iron, or nickel. As in the general paradigm for wear resistant coatings, the ductile component allows a cost effective coating to be formed on a substrate, while the carbide material provided the desired wear resistance.

Other wear resistant coatings have been developed from hard oxides. For example, titanium oxide ($TiO_2$), zirconium oxide ($ZrO_2$), aluminum oxide ($Al_2O_3$), etc. have all been used to form wear resistant coatings. As with coatings incorporating carbide hard phases, oxide hard phases may be incorporated into a metal matrix. Additionally, oxide based coatings have also been produced by densifying the hard oxides to form a ceramics.

In addition to carbides and oxides, some use has also been made of titanium boride ($TiB_2$) and zirconium boride ($ZrB_2$). As with carbides and oxides, wear resistant coatings including titanium boride and zirconium boride are generally formed by providing a titanium boride or a zirconium boride hard phase in a metallic, ceramic, or polymeric matrix.

SUMMARY OF THE INVENTION

A wear resistant material, or a metal coating, or a powder material, or a wire material, or a metallurgical product comprising aluminum boride. The aluminum boride is of the general formula $AlB_{8-16}$, thereby including, e.g., $AlB_8$, $AlB_9$, $AlB_{10}$, $AlB_{11}$, $AlB_{12}$, $AlB_{13}$, $AlB_{14}$, $AlB_{15}$ and $AlB_{16}$, as well as other alternatives within said compositional range, and mixtures thereof.

In method form the present invention comprises a method for forming a wear resistant material comprising aluminum boride of the general formula $AlB_{8-16}$ comprising supplying aluminum boride of the general formula $AlB_{8-16}$, and incorporating said aluminum boride into one of a metallic material, a ceramic material, and a polymeric material.

In alternative embodiment the present invention is directed at a method for forming a wear resistant coating comprising providing a material comprising aluminum boride of the general formula $AlB_{8-16}$, melting said material, and applying said melted material onto a substrate and forming said coating.

In yet further alternative embodiment the present invention is directed at a method of increasing the hardness of iron based alloys comprising supplying an iron alloy having a hardness, adding aluminum boride to said iron alloy of the general formula $AlB_{8-16}$, and increasing said hardness of said iron alloy by addition of said aluminum boride.

In yet further alternative embodiment, the present invention is directed at the method of forming aluminum boride phases with the general formula $AlB_{8-16}$ in alloys in which the aluminum and boron were added as elements or in standard feedstock form (such as ferroboron for boron). The targeted aluminum boride phase with the general formula $AlB_{8-16}$ then forms through precipitation in the liquid, during solidification, and/or during subsequent solid state precipitation through post heat treatments.

In yet further alternative embodiment the present invention is directed at a method of making a powder feed stock comprising providing a metallic powder, providing aluminum boride of the general formula $AlB_{8-16}$, and combining said metallic powder and said aluminum boride to form said powder feedstock.

In yet further alternative embodiment, the present invention is directed at a method of forming a metallurgical product comprising supplying aluminum boride of the general formula $AlB_{8-16}$ in powder form and forming said aluminum boride into a selected shape.

DESCRIPTION OF PREFERRED EMBODIMENTS OF THE INVENTION

Figure 1:
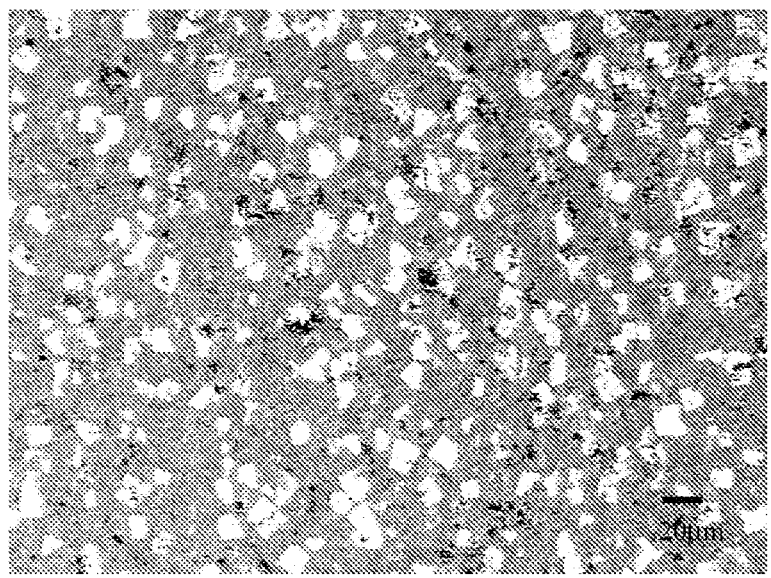
FIG. 1 SEM backscattered electron microstructure showing the microstructure of the DABX15Y1 ingot. The hard phases containing aluminum and boron along with dissolved tungsten, molybdenum, and chromium are shown as the white cubic phases.

The present invention is directed at a hard phase material providing increased hardness and wear resistance when incorporated into matrix materials. Specifically, the hard phase material of the present invention is an aluminum boride of the formula $AlB_{8-16}$. Preferably the aluminum boride is the binary compound having the structure $AlB_{12}$, however, the invention, while described with respect to $AlB_{12}$ is not limited to this particular composition. Consistent with the present invention, aluminum boride may be incorporated into a matrix material via solid-solid mixing, solid liquid mixing of aluminum boride material with the matrix material. Additionally, aluminum boride may be incorporated into the matrix material through precipitation of the aluminum boride from the aluminum and boron containing matrix material.

Referring to Table 1, the hardness of and density of a sampling of conventional hard phase materials are listed. The hardness and density of aluminum boride is also listed on Table 1. As indicated by Table 1, aluminum boride has a hardness of 26 GPa and a density of 2.58 g/cm³. While the hardness of aluminum boride is comparable to that of many conventional hard phase materials, the density is relatively lower than most other hard phase materials. The difference in density between aluminum boride and tungsten carbide is especially large.

The relatively low density of aluminum boride as compared to many conventional hard phase materials allows a much lower weight percentage of aluminum boride to form a significant volume fraction of hard phase in a matrix material. A matrix material may, therefore, be more heavily loaded with aluminum boride for a given weight percentage as compared to many conventional hard phase materials. The beneficial effects of the incorporating the preferred low density aluminum boride phase, $AlB_{12}$, can be shown for example in Table 2.

TABLE 1

Hardness of Selected Phases*

| Phase | Hardness (GPa) | Density (g/cm³) |
|---|---|---|
| C (diamond) | 70 | 3.52 |
| BN (cubic) | 45-50 | 3.48 |
| SiC | 24-28 | 3.22 |
| $Al_2O_3$ | 21-22 | 3.98 |
| $TiB_2$ | 30-33 | 4.50 |
| WC | 23-30 | 15.72 |
| TiC | 28-29 | 4.93 |
| $Si_3N_4$ | 17-21 | 3.19 |
| $AlB_{12}$ | 26 | 2.58 |

*From Ames Lab, USDOE website

TABLE 2

Weight/Volume Percent for the Following Stoichiometry; $(Nickel)_{100-x} + (AlB_{12})_x$

| X = | Weight Percent | Volume Percent |
|---|---|---|
| 10 | 2.2 | 7.3 |
| 20 | 4.9 | 15.0 |
| 30 | 8.1 | 23.3 |
| 40 | 12.0 | 32.1 |
| 50 | 17.0 | 41.5 |
| 60 | 23.5 | 51.5 |
| 70 | 32.4 | 62.3 |
| 80 | 45.1 | 73.9 |
| 90 | 64.9 | 86.4 |

Consistent with the present invention, the aluminum boride hard phase may be preferably formed as a second phase precipitate in a metallic matrix. By forming aluminum boride hard phase in a metal matrix through liquid phase or solid phase reaction, it is not necessary to mechanically mix the hard phase into a metallic matrix. Those having skill in the art will recognize that when incorporating a hard phase into a metal matrix through mechanical mixing, the concentration of the hard phase which can be dissolved into a metal matrix is often limited due to liquid solubility.

According to the present invention, the ability of metallic systems, such as iron, nickel, and cobalt containing alloys, to dissolve large amounts of boron and aluminum (typically up to 50 atomic percent of aluminum plus boron) into the liquid phase of the metallic system may uniquely form aluminum boride hard phase in situ. The formation of an in situ aluminum boride hard phase may be accomplished by dissolving boron and aluminum as separate ingredients, i.e., not preformed aluminum boride, into the metallic system. The aluminum and boron may react with one another in the liquid phase metallic system to form aluminum boride. The aluminum boride may precipitate from the liquid phase metallic system, may form during solidification, or may form through solid state precipitation through subsequent heat treatment.

The ability to form a hard phase in situ through second phase precipitation can be especially advantageous when used to create a hard phase in alloys that contain boron. Many nickel and iron based alloys common incorporate 15 to 20 at. % boron. Small amounts of aluminum may be added to such high boron alloys and may react with the boron in the alloy. When the added aluminum reacts with the boron in the alloy, aluminum boride precipitates can be formed from supersaturated solid solution in accordance with the present invention.

According to one aspect, the present invention provides method of improving wear resistance characteristics of materials. As discussed above, the relatively high hardness of aluminum boride enhances the hardness and wear resistance of a matrix, or base, material incorporating aluminum boride, and preferably, aluminum boride of the general formula $AlB_{12}$. Aluminum boride containing material may, consistent with a first aspect of the present invention, be incorporated into a matrix material using conventional incorporation techniques to enhance the wear resistance of the matrix material. Materials having improved wear resistance by the incorporation of aluminum boride may be used for hard-facing, or in specific application to reduce mechanical wear of the matrix material.

According to another aspect, a feedstock material including aluminum boride of the preferred $AlB_{12}$ hard phase is provided. Generally, the feedstock material includes the preferred $AlB_{12}$ particles incorporated into a metallic, ceramic, or polymeric matrix. The feed stock may ultimately be provided as a powder, wire, rod, etc. suitable for various subsequent processes. Example metallic materials include iron, nickel, and cobalt alloys. Examples of polymeric matrix materials include aromatic polyamides such as Kevlar™ and polyolefin material, such as oriented polyethylene sold under the Spectra™ trademark. Example ceramic materials include alumina, titania, and zirconia ceramics.

Consistent with this aspect, aluminum boride hard phase may be synthesized using appropriate chemical processes such as those which are used to make conventional oxide or carbide particles. Those having skill in the art will understand that various alternative processes may be used to produce raw aluminum boride hard phase. If necessary, the particle size of the aluminum boride may be reduced to a desired size range, for example by grinding, high energy milling, etc. Following sizing, the preferred $AlB_{12}$ particles which will typically be in the size range from 0.5 micron to 500 micron may be incorporated with an appropriate matrix.

As one example, a powder feedstock suitable for use in high-velocity oxygen-fuel (HVOF) thermal spay coating may be prepared by mixing the aluminum boride hard phase with a metallic binder such as iron, nickel, and cobalt containing metallic matrix alloys. The metallic binder may be provided as a powder, and may be mixed with the hard phase and a liquid to form a slurry. While not necessary, the use of a liquid component may facilitate mixing and dispersion of the hard phase relative to the metallic binder. The slurry may then be dried, e.g., by spray drying, to produce a powder feedstock. A powder feedstock prepared using this technique may also be suitable for use with other know thermal spray coating applications, such as plasma spraying, flame spraying, etc.

Another exemplary approach for preparing a feedstock including the preferred $AlB_{12}$ hard phase includes adding elemental aluminum and boron to an alloy of the metallic matrix to be used in the coating system. The alloy may then be processed into a powder using conventional methods such as gas, water, or centrifugal atomization, etc. According to this approach, the desired aluminum boride phase may be formed in situ in the alloy by liquid state reaction during the melting/atomization process, during solidification or subsequent cooling, or via precipitation from a supersaturated solid solution through a subsequent post heat treatment.

Feedstock containing the preferred $AlB_{12}$ phase may be processed according to a variety of techniques. For example, powder feedstock including aluminum boride may be applied to a substrate in order to produce a coating having improved wear resistance. Surface coatings may be applied to a substrate using conventional thermal spray methods, including plasma spraying, flame spraying, HVOF spraying etc. Similarly, wear resistant coatings may be applied to a substrate via weld-on hard facing, for example by plasma transfer arc welding and similar methods known in the art. In the context of the present invention, powder shall be understood to mean particles in the micron size range. The particles will be sized and classified to develop feedstock powders which are of the appropriate size range for industrial processing. For example, the high velocity oxy-fuel powder may be sized +15 to −53 microns, the plasma spray powder might be sized +45 to −106 microns, the plasma transferred arc weld overlay powder may be sized +53 to −150 micron etc.

In another example, aluminum boride may be incorporated into a wire or rod. Aluminum boride powder, or powder feedstock containing aluminum boride or aluminum with boron in various forms, may be used to form the core of a wire or rod. The wire or rod having an aluminum boride core can be used for depositing coatings using processes including twin roll wire arc, activated arc, or high velocity arc processes. Additionally, hard face coatings can be developed though MIG, TIG, or stick welding processes using wire or rod feedstock including aluminum boride.

In addition to forming a wear resistant coating or weld on a substrate, aluminum boride powder or powder feedstock containing aluminum boride may be processed alone to form various powder metallurgy products. Aluminum boride containing powder feedstock is susceptible to known powder forming processes. Exemplary processes include press and sintering, powder forging, hot isotactic pressing (HIP), and metal injection molding. Each of these processes generally involve preforming a powder material into a perform having a desired near-net-shape. The powder is then heated to densify the preform and consolidate the powder into a solid article. Often densifying and consolidating the powder is accomplished under pressure.

Similarly, solid products incorporating the preferred $AlB_{12}$ may be formed through extrusion processes including hot extrusion and equal channel extrusion. Consistent with conventional profile extrusions, linear members having a constant cross-sectional profile may be produced.

Consistent with yet another aspect of the invention, specific alloy compositions have been identified in which the incorporation or precipitation of aluminum boride provides especially advantageous improvements in hardness and wear resistance. One specific alloy identified as benefiting form the inclusion of aluminum boride is the Superhard Steel™ alloy having the general composition $Fe_{52.3}Mn_2Cr_{19}Mo_{2.5}W_{1.7}B_{16}C_4Si_{2.5}$. In the context of the present invention, the Superhard Steel™ alloys generally are iron based glass forming alloys which contain chromium, molybdenum, and tungsten. Aluminum boride may be easily incorporated into the Superhard Steel™ alloy either as particulate component mixed with the Superhard Steel™ alloy or through precipitation of an aluminum boride hard phase from as a second phase precipitate.

Additionally, the formation of an aluminum boride phase may be advantageously achieved in nickel based alloy systems. Nickel contains several low melting point (<1150° C.) eutectics at 17.0 at %, 10.0 at %, 39.5 at %, and 45.3 at % boron. These low melting point eutectics may allow very high concentrations of aluminum boride to precipitate out of supersaturated solid solution in an aluminum-boron-nickel based alloy system. Such precipitation of aluminum boride may allow the hard phase to be easily incorporated into the nickel alloy system. Aluminum and boron additions can be incorporated into existing commercial alloys such as Cu-Nickel monels, and nickel based superalloys such as 625 and 718. Examples of this will be given in the next section Additionally, the formation of an aluminum boride phase may be advantageously achieved in cobalt based systems. Analogous to nickel, cobalt forms several low melting point eutectics (<1200 C) with boron which enables processing of high boron concentrations. The approach of adding aluminum and boron or incorporating the $AlB_{12}$ hard phase can be conceptually used for existing cobalt based alloys such as Stellites or used for entirely new cobalt based alloy formulations.

EXPERIMENTAL EXAMPLES

Iron Based Alloys

In experimental settings, the addition of the preferred $AlB_{12}$ to iron based alloys have been demonstrated. The addition of the aluminum boride produced significantly enhanced hardness of the alloy.

In experiments conducted including additions of various fractions of aluminum boride and elemental aluminum to Superhard Steel™ alloy. The Superhard Steel™ alloy incorporating aluminum boride was provided in ingot form. The resultant modified alloys were found to exhibit a significant increase in hardness as compared to the unmodified Superhard Steel™ alloy.

According to the experiment, Superhard Steel™ alloy SHS717, having a structure of $Fe_{52.3}Mn_2Cr_{19}Mo_{2.5}W_{1.7}B_{16}C_4Si_{2.5}$, was melted and additions of aluminum and boron were made at a 1 to 12 ratio to provide aluminum boride in the alloy at 10, 15, 20, and 63 atomic percent. The alloy was subsequently formed into ingots and allowed to cool. The resultant harnesses of these modified alloys, measured at a load of 100 kg/mm$^2$ and 300 kg/mm$^2$, are given in Table 3. Note that all hardness indentations are reported as an average of a minimum of 5 indentations.

As can be seen from Table 3, the additions of aluminum and boron resulted in significant increases in hardness compared to the control alloy without the additions. A 10 at % loading of aluminum boride produced a hardness increase of 268 at 100 kg/mm$^2$. At an aluminum boride content of 15 at % the greatest hardness increase was witnessed, producing a hardness increase of 560 at 100 kg/mm$^2$ compared to the control alloy. When the aluminum boride content was further increased to 20 at % the measured hardness was slightly lower than that measured at a 15 at % aluminum boride content, being only 485 at 100 kg/mm$^2$ greater than the control alloy. A still further increased aluminum boride content of 63 at % resulted in a brittle structure that fractured at approximately 1200 at 100 kg/mm$^2$.

Figure 2:
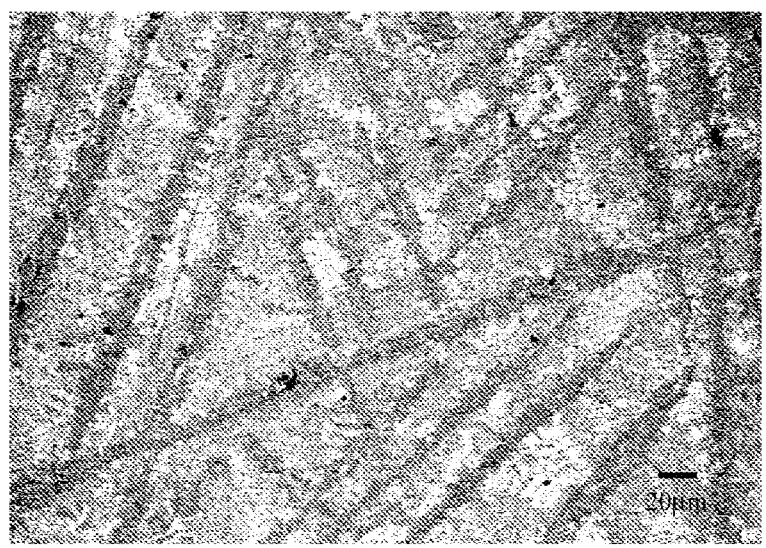
FIG. 2 SEM backscattered electron microstructure showing the microstructure of the DABX0 ingot.

Test specimens were also produced including aluminum additions above the aluminum and boron additions in a 1 to 12 ratio. As seen in Table 3, the further additions of aluminum also resulted in an increase in hardness as compared to the control alloy. At a 1 at % aluminum addition a hardness increase of 630 at 100 kg/mm$^2$ above the control alloy was measured and this concentration level appeared to be optimum. The microstructure of the cast ingot of this alloy, DABX15Y1 is shown in the micrograph of FIG. 1. Additionally, the microstructure of the cast ingot of the DABX0 alloy is shown in the micrograph of FIG. 2. Both images were taken under the same imaging conditions in the SEM. Clearly the addition of Al and B causes a cubic precipitate to form upon solidification which nominally has a cubic shape.

Similarly, test specimens prepared including 3, 5, and 7 at % aluminum in combination with 15 at % aluminum and boron additions at a 1 to 12 ratio provided increased hardness measurements compared to the control alloy. While not intending to be bound to any particular theory, the hardness increases resulting from the further addition of aluminum in combination with the 15 at % aluminum/boron in a 1 to 12 ratio is believed to occur from the further aluminum additions reacting with boron in the SHS717 alloy. The reaction between the further aluminum additions and the boron native in the SHS717 alloy may produce additional aluminum boride hard phase ($AlB_{12}$) in the SHS717 matrix, thereby providing further hardness enhancements. This example is given to show how the aluminum and boron ratios can be varied away from the preferred 1/12 stoichiometry and yet high hardness can still be obtained.

Based on hardness measurements taken on a third series of test specimens in which 1, 3, 5, and 7 at % aluminum is added to the SHS717 alloy without boron, metallic aluminum in the alloy appears to soften the alloy. This is consistent with the knowledge that aluminum is a relatively soft metal. The softening effect of metallic aluminum in the alloy may explain the decrease in hardness of the alloy as the further aluminum additions are increased from 1 at. % to 3, 5, and 7 at %. This example is given to specifically point out that the combined addition of aluminum and boron are preferred to get high hardness.

As a final point, it is noted that Superhard Steel™ alloys are susceptible to microstructural refinements that may increase the hardness of an unmodified alloy. These microstructural refinements involve establishing amorphous structures and micro-crystalline domains as desired within the metallic structure. When powder feedstock including a Superhard Steel™ alloy matrix incorporating aluminum boride hard phase is sprayed as a coating, it is contemplated herein that one can further increase the hardness of the coatings by refining the microstructure of the Superhard Steel™ alloy matrix.

TABLE 3

Composition and Hardness for Iron Based Alloys with the Following Stoichiometry;
$[(Fe_{52.3}Mn_2Cr_{19}Mo_{2.5}W_{1.7}B_{16}C_4Si_{2.5})_{100-x-y} + (AlB_{12})_x + Al_y]$

| Alloy Name | X = | Y = | Hardness (HV100 kg/mm$^2$) | Hardness (HV300 kg/mm$^2$) |
|---|---|---|---|---|
| DABX0 | 0 | 0 | 1227 | 1173 |
| DABX10 | 10 | 0 | 1495 | 1279 |
| DABX15 | 15 | 0 | 1787 | 1573 |
| DABX20 | 20 | 0 | 1712 | 1511 |
| DABX63 | 63 | 0 | ≈1200 (too brittle) | — |
| DABX15Y1 | 15 | 1 | 1857 | 1609 |
| DABX15Y3 | 15 | 3 | 1765 | 1486 |
| DABX15Y5 | 15 | 5 | 1566 | 1394 |
| DABX15Y7 | 15 | 7 | 1734 | 1148 |
| DABY1 | 0 | 1 | 1058 | 826 |
| DABY3 | 0 | 3 | 882 | 823 |
| DABY5 | 0 | 5 | 1027 | 876 |
| DABY7 | 0 | 7 | 858 | 838 |

Nickel Based Alloys

In experimental settings, the addition of $AlB_{12}$ to nickel based alloys have been demonstrated. The addition of the aluminum boride produced significantly enhanced hardness of the alloy.

In Table 4, the hardness is shown for pure nickel alloy which have been alloyed with simultaneous additions of aluminum and boron. The three elements were placed at the stoichiometric ratios listed in Table 4, and then arc-melted into 5 gram ingots. As shown, the hardness increased dramatically with the aluminum and boride additions up to an HV100 hardness of 1462. Note that all hardness indentations are reported as an average of a minimum of 5 indentations. Also, note that nickel is a very soft face centered cubic element and the hardness of pure nickel is less than 200 HV100.

TABLE 4

Alloy Composition and Hardness for $(Nickel)_{100-x} + (AlB_{12})_x$

| Alloy | Stoichiometry | HV100 (kg/mm$^2$) | HV300 (kg/mm$^2$) |
|---|---|---|---|
| NABX19 | $(Ni)_{81} + (AlB_{12})_{19}$ | 676 | 616 |
| NABX33 | $(Ni)_{67} + (AlB_{12})_{33}$ | 1130 | 1002 |
| NABX43 | $(Ni)_{57} + (AlB_{12})_{43}$ | 1462 | 1363 |
| NABX49 | $(Ni)_{51} + (AlB_{12})_{49}$ | 1450 | 1260 |

In Table 5, hardness is shown at a 100 gram and 300 gram load for modified ingots of nickel based alloys based on commercial compositions. The NABX43N6 alloy mimics a commercial 625 nickel superalloy, the NABX43N7 mimics a commercial 718 nickel superalloy, and the NABX43M4 mimics a Cu—Ni cartridge brass monel. Extremely high hardness, much above the published base values was obtained in the aluminum and boron modified alloys. Note that all hardness indentations are reported as an average of a minimum of 5 indentations.

TABLE 5

Alloy Composition and Hardness for (Nickel Alloy)$_{100-x}$ + (AlB$_{12}$)$_x$

| Alloy | Stoichiometry | HV100 (kg/mm$^2$) | HV300 (kg/mm$^2$) |
|---|---|---|---|
| NABX43N6 | (Ni$_{64}$Cr$_{27}$Mo$_6$Fe$_3$)$_{57}$ + (Al$_1$B$_{12}$)$_{43}$ | 1488 | 1359 |
| NABX43N7 | (Ni$_{54}$Cr$_{22}$Mo$_2$Fe$_{22}$)$_{57}$ + (Al$_1$B$_{12}$)$_{43}$ | 1186 | 1223 |
| NABX43M4 | (Ni$_{69}$Cu$_{31}$)$_{57}$ + (Al$_1$Bu$_{12}$)$_{43}$ | 918 | 869 |

In Table 6, HV100 hardness is shown for aluminum and boron additions to an existing commercial alloy C-22 (Ni$_{63.0}$Cr$_{24.6}$Mo$_{8.2}$Fe$_{3.3}$W$_{0.7}$V$_{0.2}$). The alloys were made by adding aluminum and boron additions to C-22 powder and then melting the feedstock into ingots using arc-melting. The arc-melted 15 gram ingots were then further processed into melt-spun ribbons by ejecting a liquid melt onto a rapidly moving copper wheel with a tangential velocity of 15 m/s. The ribbons were then metallographically mounted and polished and the cross sections of the approximately 135 micron wide ribbon were tested for hardness using Vickers at a 100 gram load. As can be seen, while the base C-22 alloy was soft at 268 kg/mm$^2$, the hardness of the aluminum and boron modified alloys increased dramatically to a maximum of 1425 kg/mm$^2$. Note that all hardness indentations are reported as an average of a minimum of 5 indentations.

TABLE 6

Alloy Composition and Hardness for (Ni$_{63.0}$Cr$_{24.6}$Mo$_{8.2}$Fe$_{3.3}$W$_{0.7}$V$_{0.2}$)$_{100-x}$ + (AlB$_{12}$)$_x$ Melt-Spun Ribbon

| Alloy | Stoichiometry | HV100 (kg/mm$^2$) |
|---|---|---|
| NACX0 | Ni$_{63.0}$Cr$_{24.6}$Mo$_{8.2}$Fe$_{3.3}$W$_{0.7}$V$_{0.2}$ | 268 |
| NACX19 | (Ni$_{63.0}$Cr$_{24.6}$Mo$_{8.2}$Fe$_{3.3}$W$_{0.7}$V$_{0.2}$)$_{81}$ + (Al$_1$B$_{12}$)$_{19}$ | 1425 |
| NACX27 | (Ni$_{63.0}$Cr$_{24.6}$Mo$_{8.2}$Fe$_{3.3}$W$_{0.7}$V$_{0.2}$)$_{27}$ + (Al$_1$B$_{12}$)$_{27}$ | 1397 |

Cobalt Based Alloys

In experimental settings, the addition of the preferred AlB$_{12}$ to cobalt based alloys have been demonstrated. The addition of the aluminum boride produced significantly enhanced hardness of the alloy.

The hardness at 100 gram and 300 gram load of cobalt alloys are given in Table 7. The alloys were made by taking cobalt, aluminum, and boron, and mixing them at the appropriate ratios to provide a feedstock charge. The charge was then melted into 5 gram ingots using arc-melting in an inert environment. The ingots were then sectioned and metallographically mounted and polished. Vickers hardness indentations were taken at the cross section of the indentations. Note that all hardness indentations are reported as an average of a minimum of 5 indentations. The hardness of cobalt was found to be raised significantly from 210 to a maximum of 1569 with the simultaneous additions of aluminum and boron and subsequent aluminum boride formation.

TABLE 7

Alloy Composition and Hardness for (Co)$_{100-x}$ + (AlB$_{12}$)$_x$

| Alloy | Stoichiometry | HV100 (kg/mm$^2$) | HV300 (kg/mm$^2$) |
|---|---|---|---|
| CABX0 | Co | 210 | 179 |
| CABX18 | (Co)$_{82}$ + (Al$_1$B$_{12}$)$_{18}$ | 805 | 773 |
| CABX37 | (Co)$_{63}$ + (Al$_1$B$_{12}$)$_{37}$ | 1569 | 1318 |

What is claimed is:

1. A method for forming a wear resistant material comprising aluminum boride of the general formula AlB$_{8-16}$ comprising:
   (a) supplying a metallic system comprising (Fe$_{52.3}$Mn$_2$Cr$_{19}$Mo$_{2.5}$W$_{1.7}$B$_{16}$C$_4$Si$_{2.5}$);
   (b) adding up to 50 atomic percent of aluminum and boron as separate ingredients to said metallic system, forming a supersaturated solution;
   (c) melting said metallic system and precipitating aluminum boride from a liquid phase of said metallic system including said aluminum and said boron to form said wear resistant material, wherein said metallic system forms a matrix in which said aluminum boride is incorporated, and at least 24 atomic percent of said wear resistant material comprises aluminum and boron.

2. The method of claim 1, further comprising atomizing said metallic system into particulate form.

3. The method of claim 2 wherein said step of atomization includes one of a gas, water or centrifugal atomization method.

4. The method of claim 1, wherein said wear resistant material has the following composition:

[(Fe$_{52.3}$Mn$_2$Cr$_{19}$Mo$_{2.5}$W$_{1.7}$B$_{16}$C$_4$Si$_{2.5}$)$_{100-x-y}$+ (AlB$_{12}$)$_x$±Al$_y$]

wherein x is in the range of 10 and 41 and y is in the range of 0 to 7.

5. A method for forming a wear resistant material comprising aluminum boride of the general formula AlB$_{8-16}$ comprising:
   (a) supplying a metallic system comprising an iron based alloy including manganese, chromium, molybdenum, tungsten, carbon, silicon and boron,
   (b) adding up to 50 atomic percent of boron and aluminum to said iron based alloy, forming a supersaturated solution wherein said aluminum reacts with said boron; and
   (c) melting said metallic system and precipitating aluminum boride from a liquid phase of said metallic system including said boron and aluminum to form said wear resistant material, wherein said metallic system forms a matrix in which said aluminum boride is incorporated and said wear resistant material has the following composition:

[(Fe$_{52.3}$Mn$_2$Cr$_{19}$Mo$_{2.5}$W$_{1.7}$B$_{16}$C$_4$Si$_{2.5}$)$_{100-x-y}$+ (AlB$_{12}$)$_x$+Al$_y$], wherein x is in the range of 10 and 41 and y is in the range of 0 to 7.

6. The method of claim 5 wherein said metallic material has a hardness "x", and upon forming said aluminum boride said hardness increases to a value "y" wherein y>x, and wherein upon incorporation of aluminum, said hardness increases to a value "z", wherein z>y.

7. The method of claim 5, further comprising atomizing said metallic system into particulate form.

8. A method for forming a wear resistant material comprising aluminum boride of the general formula AlB$_{8-16}$ comprising:

(a) supplying a metallic system comprising $(Fe_{52.3}Mn_2Cr_{19}Mo_{2.5}W_{1.7}B_{16}C_4Si_{2.5})$;

(b) adding up to 50 atomic percent of aluminum and boron as separate ingredients to said metallic system, forming a supersaturated solution;

(c) melting said metallic system and precipitating aluminum boride from a liquid phase of said metallic system including said aluminum and said boron to form said wear resistant material, wherein said metallic system forms a matrix in which said aluminum boride is incorporated.

9. The method of claim 8, further comprising atomizing said metallic system into particulate form.

10. The method of claim 9, wherein said step of atomization includes one of a gas, water or centrifugal atomization method.

11. The method of claim 9, wherein said wear resistant material has the following composition:

$$[(Fe_{52.3}Mn_2Cr_{19}Mo_{2.5}W_{1.7}B_{16}C_4Si_{2.5})_{100-x-y} + (AlB_{12})_x + Al_y]$$

wherein x is in the range of 10 and 41 and y is in the range of 0 to 7.

12. The method of claim 7, wherein said step of atomization includes one of a gas, water or centrifugal atomization method.

* * * * *